United States Patent Office 2,800,387
Patented July 23, 1957

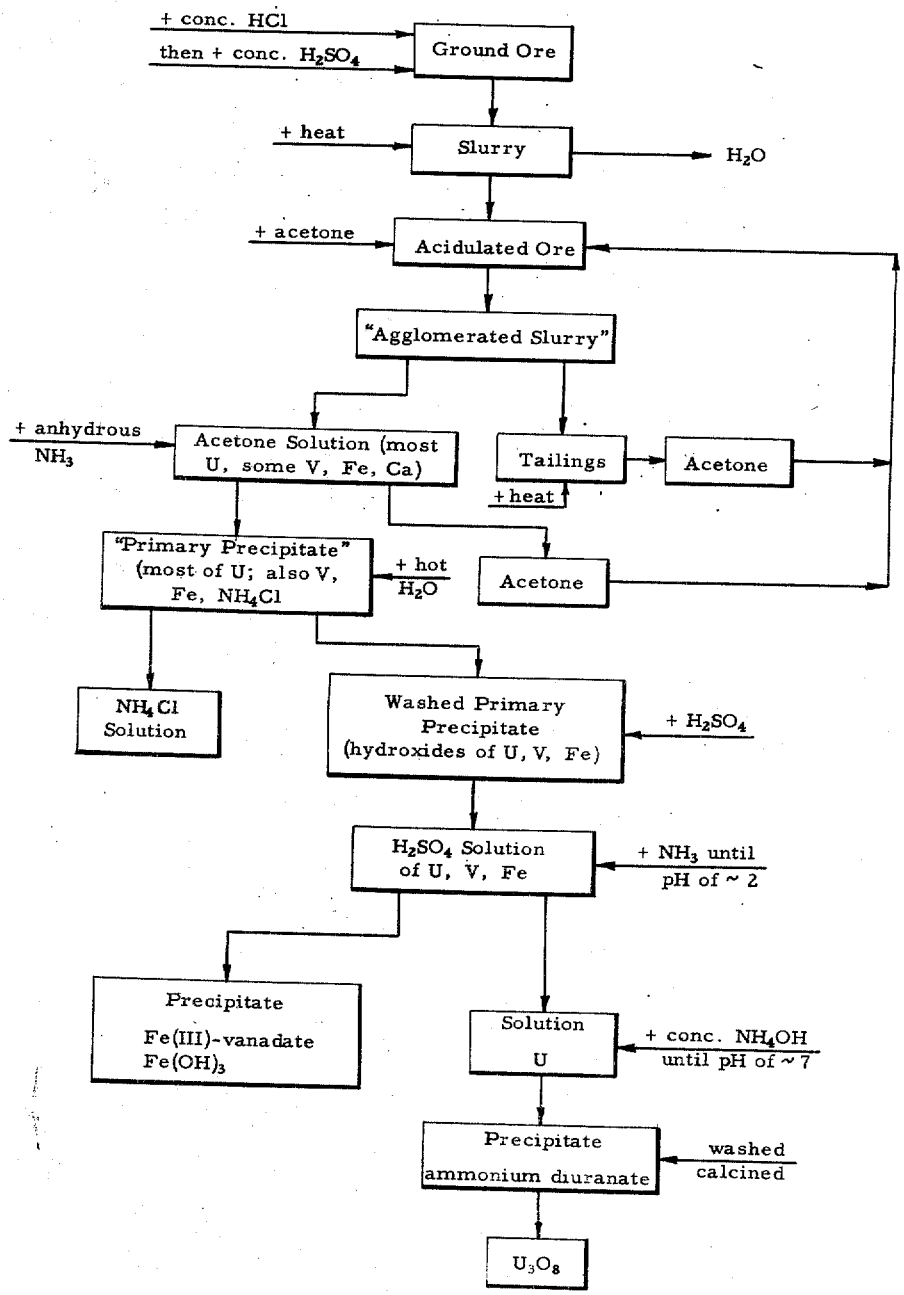

2,800,387

URANIUM RECOVERY FROM ORES WITH HYDROCHLORIC ACID AND ACETONE

Robert B. Kimball, Idaho Falls, Idaho, and Robert A. Ewing, Worthington, Ohio, assignors to the United States of America as represented by the United States Atomic Energy Commission Application January 24, 1956, Serial No. 561,166

6 Claims. (Cl. 23—14.5)

This invention deals with a process of recovering uranium values from ores and in particular with the recovery by solvent extraction from the so-called Western ores such as carnotite, pitchblende and shale after acid treatment.

Hydrometallurgical processes comprising acid treatment and solvent extraction have been used heretofore for recovering uranium from ores, but in most instances the slurries obtained thereby showed a tendency to slime which caused serious thickening and filtration problems.

It is an object of this invention to provide a process for recovering uranium values from ores in which the above-mentioned difficulties are not encountered.

It is thus an object of this invention to provide a process for recovering uranium values from ores in which no sliming takes place and in which good settling of the solids is obtained during solvent extraction, even when the particles of the ore are very fine.

It is another object of this invention to provide a process for recovering uranium values from ores in which the solid particles during extraction settle so fast that a clear supernatant is obtained immediately and filtration is unnecessary.

It is another object of this invention to provide a process for recovering uranium values from ores which require a comparatively short period of time so that a high throughput is possible.

It is still another object of this invention to provide a process for recovering uranium values from ores which is highly economical, this in particular as to consumption of reagents.

It is still another object of this invention to provide a process for recovering uranium values from ores which can be carried out in simple, nonbulky equipment even when large quantities of ore are to be processed.

It is finally also an object of this invention to provide a process for recovering uranium values from ores in which the use of excessive acid is not required.

These objects are accomplished by disintegrating the uranium values- and lime-containing ore, contacting the ore with an aqueous medium containing free hydrochloric acid whereby a slurry is obtained and lime is converted to calcium chloride, contacting the slurry with acetone whereby the uranium values are taken up by an extract phase and a residue settles in said extract phase, and separating the extract phase from the residue.

The ores were first ground in a jaw crusher and then passed through a disk grinder. Although the particle size of —12 is sufficiently fine in every respect to obtain satisfactory uranium recovery, it was preferred in many cases to crush the ore to a finer degree because the extraction was thought to be slightly better from the finer material and also because it was found that, using the conditions of the process of the invention, the fine material settled faster than the coarse material.

In most instances the ore can be acid-treated or "acidulated" immediately after grinding. A few ores, though, in particular those containing organic carbonaceous material, require a pretreatment in order to obtain the best possible uranium recovery. This pretreatment may consist in roasting at between 450 and 500° C. or in the addition of an oxidizing agent for the acidulation step. The latter means is preferred, and the addition of potassium chlorate, for instance in a quantity of 10 lbs. per ton of ore, has been found suitable. It is emphasized, however, that the process of this invention is satisfactorily operative without this pretreatment also for the organic carbonaceous material-containing ores and that the extraction is merely improved by the pretreatment and this by an average amount of about 10 to 15%.

The acidulated ore is then contacted with acetone for extraction. It was found that during this leaching or extraction step an extremely fast and complete settling of the ore is obtained if the ore particles are in a state of agglomeration and that this state of agglomeration is dependent upon the presence of calcium chloride. For these reasons the ore should contain some lime or limestone which reacts with the hydrochloric acid to form the necessary amount of calcium chloride. A content of from 0.4 to 0.6% calcium carbonate in the ore was found optimal for this purpose.

Some of the ores which were especially low in calcium carbonate showed slow settling during acidulation and extraction. In these instances the settling rate was improved by adding calcium carbonate or calcium chloride, preferably the latter, to the ore; the average quantity added in said instances was 20 lbs. of calcium chloride per ton of ore. Another way of achieving the same result consisted of blending low-lime and high-lime ores in the proper amounts to obtain the calcium carbonate content of between 0.4 and 0.6%.

Another proof of the importance of the presence of calcium chloride for good settling are runs which the inventors carried out with methanol and ethanol, respectively, instead of acetone, as the extractants. Extraction was good also in these instances, but there was no agglomeration and settling was poor; this can be explained by the comparatively high solubility of calcium chloride in these lower alcohols.

The ore is opened with acid. While theoretically any mineral acid is operative, certain factors have to be considered in choosing the acid. In the first place, some hydrochloric acid has to be present in order to obtain the required amount of calcium chloride. However, it is not advisable to use hydrochloric acid exclusively for several reasons: firstly, hydrochloric acid is rather expensive and it should therefore be replaced, when feasible, by less expensive acids, for instance, sulfuric acid; secondly, an excess of calcium chloride, that is a quantity higher than that formed from about 0.6% of calcium carbonate makes the mass so gummy that a poor uranium extraction is obtained with the acetone. On the other hand, sulfuric acid alone does not bring about satisfactory results either, mainly because calcium sulfate, which is then formed from the calcium carbonate, does not have the agglomerating effect of the calcium chloride; thus slow and graded settling occurs. Another disadvantage of sulfuric acid is the formation of uranyl sulfate which is slightly soluble only in acetone and also forms acetone-insoluble double salts.

Optimal operating conditions were obtained by opening the bulk of the ore and lime with sulfuric acid but then using hydrochloric acid for converting the required quantity of from 0.4 to 0.6% of calcium carbonate and all of the uranium present to the chlorides. Of course, if the ore to be processed contains less than 0.6% calcium carbonate, sulfuric acid should not be used at all. One additional advantage of substituting concentrated sulfuric acid for part of the hydrochloric acid is that less water is introduced into the system so that less or no drying operation is required.

The formation of hydrochloric acid in situ by the addition of sodium chloride and sulfuric acid, both of which are rather inexpensive, was also investigated; poor settling and poor extraction (26%) were obtained in this instance. When ammonium chloride (formed in the process) and sulfuric acid were added to form hydrochloric acid in situ, no agglomeration was obtained, settling was poor, and the extraction was about 64%.

Although it appears logical first to add the sulfuric acid and then the hydrochloric acid, it was found that by reversing the order of sequence better results were obtained. This was true because it was difficult to wet the ore uniformly with small amounts of concentrated sulfuric acid. If hydrochloric acid was admixed first and then sulfuric acid, a more uniform mixture was obtained with less difficulty. The extraction was not impaired by this reversal of steps.

While the acidulation step can be carried out in any apparatus known to those skilled in the art, a rotary drum was preferred by the inventors which was equipped with spiral flights. The drum used had a diameter of 2 ft. and was 7 ft. long.

As will be shown more in detail later, the quantity of water present during extraction with acetone also has some bearing on the degree of agglomeration obtained and should be relatively low; the acids are therefore advantageously added in concentrated form. By using concentrated sulfuric acid for part of the acidulation, the quantity of water introduced with the acid was reduced, as has been mentioned before. A total quanity of acids of 105 lbs. (expressed in equivalent of a 100% hydrochloric acid) per ton of ore was the average amount used; however, acid quantities as low as 87.5 lbs. per ton of ore were found adequate and yielded an extraction with acetone of 97% after acidulation at room temperature for 15 minutes. The quantity of acid does not have to be excessive because for leaching with acetone no free acid is required; no or a low acid content is even desirable in order to reduce the quantity of ammonia necessary for subsequent treatment of the acetone extract, which will be described later, and also to prevent the degradation of the acetone by the effect of the acid.

For most ores acidulation for 15 minutes at room temperature (about 25° C.) suffices. In some instances a "bake" with the acid or acids at 75° C. was carried out for 30 minutes. This latter embodiment is advantageous when a higher water content is present than is desirable for rapid settling.

While the slurry obtained in the acidulation step can be contacted as is with acetone for extraction, it is advisable in some cases to subject the slurry to a drying step. This is advantageous in view of the fact that the water content has a bearing on the agglomeration during extraction. Drying can either be carried out to the desired water content or else to complete dryness. In the latter case the desired amount of water is then added to the acetone. Drying was preferably carried out in a rotary furnace although, it will be understood, any other device customary in the art may be used instead. The holdup time of the slurry in the drier ranged from 30 to 40 minutes. From the drier the acidulated ore was usually taken to the extractor by means of a conveyor which at the same time acted as a cooler when the ore had been heated for drying purposes.

As has been indicated above, the water content is important. If the water content is too low, no, or unsatisfactory, agglomeration and consequently no settling, occurs; if the water content is too high, dispersion takes place, which again means that there is no settling. The quantity giving the best results was between 50 and 150 grams of water per liter of the acetone system (hereinafter simply referred to as "$gH_2O/l.$ acetone"). The higher amounts within this range were preferred when the ore had a relatively high lime content and when a high proportion of the total acid used was sulfuric acid. For low-lime ores, say, for ores containing about 3% of calcium carbonate and a 50:50 acid ratio ($H_2SO_4:HCl$ equivalent), water in a quanity between 50 and 100 g./l. was the preferred range, while for an ore containing about 14% of calcium carbonate, for instance, and a $H_2SO_4:HCl$ ratio of 80–90%:20–10% the optimum water quantity ranged between 125 and 150 g./l. acetone. Apart from this, finely ground ore did require slightly more water within the above range than did a coarser ore.

For the extraction step a great number of solvents were studied. Lower alcohols, such as methanol and ethanol, for instance, were found to yield a very good extraction, but agglomeration was nil as has been set forth before. Ketones other than acetone were also studied. Methylethylketone and methylisobutylketone were found to be satisfactory extractants. However, these two ketones form azeotropes with water, which means that the solvents would eventually contain the equilibrium content of water. Acetone, which does not have any of these drawbacks, was preferred as the solvent.

While the extraction or leaching with acetone can be carried out in any device known to those skilled in the art, the inventors preferred a cylindrical extractor arranged in an angle of less than 45° with the horizontal. Throughout the entire length of the extractor and parallelly thereto there was running an endless chain which carried a plurality of drag blades. The ore was introduced at the lower end of the extractor and moved by the drag blades through a pool of acetone in the lower section of the extractor. The tailings were then moved through the center part of the extractor where they were washed with a fresh supply of acetone. The washed tailings were then taken to the upper section of the extractor which was heated by steam coils and where the acetone was removed from the tailings. The ore particles settled almost instantaneously even when the extractor had been vibrated, and the supernatant was immediately clear and free of suspended fines. The particle size of the ore did not have an effect on this satisfactory operation. The pregnant acetone was continually removed from the lower end of the extractor and pumped into a precipitation column. The uranium can be recovered from the acetone solution by any known method; however, precipitation was preferred. One of the most satisfactory embodiments of the invention is now being described.

Anhydrous ammonia was added to the acetone solution until precipitation was complete; this was at a pH value of about 7. Between 3 and 5 lbs. of ammonia were required per pound of uranium. This "primary precipitate" settled rapidly and filtered well in spite of its being very voluminous, probably because it had a low degree of hydration. The "primary precipitates" averaged contents of between 3 and 7% uranium, 1 to 5% vanadium, 10 to 20% iron, 0.5 to 3% calcium and 60% or more of ammonium chloride, the specific content depending on the composition of the ore. Specifications for $U_3O_8$ suitable for refinery are the following contents: at least 25% $U_3O_8$, not more than 10% vanadium (in regard to the uranium content) and less than 0.1% each of $NH_4^+$ and $Cl^-$.

The primary precipitate was separated from the supernatant by filtration and the "raw cake" thus obtained was heated to remove and recover the acetone by vaporization and condensation, respectively. This acetone as well as that recovered from the tailings remaining after the acetone extraction were recycled into the process.

The "raw cake" was then treated in order to remove the large quantities of ammonium chloride. For this purpose it was repulped in water whereby the ammonium chloride was leached out. The washed primary precipitate was then separated from the ammonium chloride solution by filtration. Repulping was preferably carried out at a pulp density of 25% and with hot water to facilitate filtration. Several repulping-filtration cycles can be applied for better ammonium chloride removal. In one pass 75 to 80% of the ammonium chloride was usually leached out. In one example when a pulp density of 15% and two successive repulping-filtering cycles were used, the ammonium chloride content was reduced from 39.4 to 1.2%, which represents a removal of about 97%. Only 85% of the calcium was removed in this run. The washed precipitate averaged from 10 to 15% uranium, from 5 to 9% vanadium, from 20 to 35% iron, and less than 1% chlorine.

According to the preferred embodiment of this process the precipitate was then dissolved in sulfuric acid, and the solution thus obtained was fractionally neutralized with ammonia, preferably anhydrous ammonia. It was found that if neutralization was carried to a pH value of roughly 2, most of the vanadium and some of the iron precipitated as ferric vanadate and any excessive iron as the ferric hydroxide; but practically all uranium remained in solution. For instance, at a pH of between 2.1 and 2.2 the vanadium content in the sulfuric acid solution had been reduced from 100% to 3 to 4%; from 0.17 to 0.22% of the uranium in the solution had been co-precipitated. When neutralization was carried through to the pH value of 2.5, the vanadium content of the solution had been reduced to 1.8%, but 0.5% of the uranium had been precipitated. The pH value of between 2.1 and 2.2 was considered optimal for the separation of uranium from vanadium. For better filterability of the precipitate a short digestion at elevated temperature but below the boiling point of the solution was found helpful; a temperature between 70–90° C. was found best for this purpose.

After separation of the vanadium precipitate, for instance, by filtration, the filtrate, which contained practically all of the uranium, was then furthermore neutralized with concentrated ammonia until a pH value of about 7 was attained; uranium was precipitated thereby as ammonium diuranate. Most of the ammonium chloride that had not been removed previously by repulping was eliminated now when the diuranate was filtered from the ammonium chloride-containing solution.

The precipitate of ammonium diuranate was then washed with ammonium hydroxide and calcined to obtain the "black oxide," $U_3O_8$. Any remainder of ammonium chloride was driven off in the calcination step so that the final product contained less than 0.1% Cl$^-$, the maximum allowed by specifications. The $U_3O_8$ content of the final product was usually above 60%.

In the attached drawing a flow sheet is presented of a preferred embodiment of the process of this invention as carried out with a uranium-containing carnotite ore of average lime content. This flow sheet is self-explanatory.

In the following two examples are given for the purpose of illustrating the invention without the intention to limit its scope to the details given therein.

*Example I*

50-gram samples of carnotite containing 3.0% of $CaCO_3$, 1% of $Fe_2O_3$, 0.27% of uranium values, 0.94% of vanadium values, 0.24% total $SO_4$, 0.09 $SO_4^=$, 1.4% $CO_2$ and having a particle size of −12 mesh was mixed and cured with a 37% hydrochloric acid in the quantities shown in the table below; these quantities are expressed on the basis of a 100% HCl. The curing conditions are also shown in the table. The slurry obtained in each instance was leached with 50 milliliters of acetone at room temperature, and the acetone solution obtained thereby was separated from the tailings by filtration. The tailings were washed with acetone and then analyzed for uranium. The extraction results calculated from the uranium contents of the residues are compiled in the table.

| Curing Conditions | | | | | Uranium, Percent | |
|---|---|---|---|---|---|---|
| HCl, lbs./ton ore | | Time, Min. | Temp., C. | Leach-Liquor Acidity, N | Extraction |
| Added | Consumed | | | | |
| 122.5 | 111.5 | 60 | Room Temp. | 0.15 | 98 |
| 122.5 | 111 | 30 | ---do--- | 0.16 | 98 |
| 122.5 | 110 | 15 | ---do--- | 0.17 | 98 |
| 122.5 | 108 | 5 | ---do--- | 0.20 | 97 |
| 114 | 105 | 5 | ---do--- | 0.20 | 97 |
| 105 | 100 | 5 | ---do--- | 0.15 | 96 |
| 114 | 114 | 30 | 75 | 0 | 98 |
| 114 | 111 | 15 | 75 | 0.04 | 98 |
| 114 | 107 | 5 | 75 | 0.10 | 97 |
| 105 | 105 | 30 | 75 | 0 | 96 |
| 122.5 | 122.5 | 30 | 75 | 0 | 98 |
| 140 | 110 | 60 | Room Temp. | 0.21 | 98 |
| 175 | 110 | 60 | ---do--- | 0.45 | 98 |
| 105 | 99 | 15 | ---do--- | 0.08 | 98 |
| 96 | 90 | 15 | ---do--- | 0.08 | 96 |
| 87.5 | 87.5 | 15 | ---do--- | 0 | 97 |

This table indicates that curing at room temperature is as efficient as curing at 70° C. and that a curing time of 15 minutes yields optimal extraction so that a longer curing time is of no advantage. The table furthermore shows that no free acid is necessary in the leaching liquid during the extraction with acetone for best results.

The acetone leach solution obtained had the following composition: 1.38 g. U/l., 0.78 g. V/l., 3.6 g. Fe/l., 1.67 g. Ca/l., 0.30 g. Al/l. and 142 g. Cl/l.

Anhydrous ammonia was added to 1 liter of the solution to precipitate the vanadium and the uranium. The precipitate was then filtered and repulped with 250 ml. of water; the slurry was digested near the boiling point for a few minutes, the precipitate was filtered off and given two 100-ml. washes. After repulping the precipitate had retained only 16% of the initial chloride content; the two washes reduced this further to 1.5% of chlorine.

The washed precipitate was then redissolved in sulfuric acid and a small amount of potassium chlorate was added to the sulfuric acid solution. This solution was then diluted to 500 ml. and concentrated ammonium hydroxide was added until the pH value of the solution, after filtration and cooling to room temperature, was 2.0. The precipitate of ferric canadate, after digestion near the boiling point for 10 minutes, was filtered off. The filtrate was then further neutralized with concentrated ammonium hydroxide until a pH value of 7.6 was obtained. A precipitate formed which was sepaarted from the solution by filtration and calcined. The calcined product contained 64.9% of $U_3O_8$, 0.71% of $V_2O_5$, 28.6% of $Fe_2O_3$, 2.1% of $SiO_2$, 1.4% of $MnO_2$, 0.4% of CaO, less than 0.001% of $NH_4^+$, and less than 0.1% of Cl$^-$.

The vanadium content of the precipitate was well under maximum specifications. Both ammonia and chloride contents were also satisfactory. The only significant loss of uranium was to the ferric vanadate precipitate; it amounted to 2% of the uranium.

Example II illustrates that the presence of chloride is an important factor for good and rapid settling.

*Example II*

An ore which had a calcium content of 1.6% (expressed as calcium carbonate), a uranium content of 0.26%, a vanadium content of 0.60%, 79.8% of $SiO_2$, 5.8% of $Al_2O_3$, 1.8% of $Fe_2O_3$, 3.9% total $SO_4$, 0.9% of $SO_4^=$, 4.1% of total C, and 1.0% of $CO_2$ was acidulated with 115 lbs. of hydrochloric acid per ton of ore and then extracted with acetone. Settling was poor. The more detailed analyses of the ore showed that it had a $SO_4^=$ content of 0.75% and it was concluded that most of the calcium was actually present as calcium sulfate. Thus only very little calcium carbonate was available for the formation of calcium chloride.

Another run was carried out with the same ore but calcium chloride was admixed thereto in a quantity corresponding to 20 lbs./ton of ore; the mass was again acidulated and extracted with acetone as before. This time agglomeration and settling rate were as satisfactory and rapid as in all cases where the ore originally contained a higher quantity of calcium carbonate so that the leached slurry had a higher content of calcium chloride.

It will be understood that this invention is not to be limited to the details given herein and that it may be modified within the scope of the appended claims.

What is claimed is:

1. A process of recovering uranium values from uranium- and calcium carbonate-containing ores by solvent extraction, comprising disintegrating the ore; adding to the ore an aqueous acid medium containing free hydrochloric acid until from 0.4 to 0.6 percent of the calcium carbonate has been neutralized whereby an aqueous slurry is obtained; digesting said slurry; adjusting the water content of said slurry to a predetermined value; contacting the slurry with acetone whereby an acetone slurry is obtained, the uranium values are taken up by an extract phase and a residue settles in said extract phase, said predetermined value being of such a magnitude that the water content of the acetone slurry lies between 50 and 150 grams of water per liter of the acetone slurry; and separating the extract phase from the residue.

2. The process of claim 1 wherein an ore containing less than 0.4% calcium carbonate is used and calcium chloride is added in the process prior to extraction in a quantity to obtain the desired calcium chloride content.

3. The process of claim 1 in which the calcium chloride content is adjusted by blending low-lime ore and high-lime ore.

4. The process of claim 1 in which the aqueous medium is concentrated hydrochloric acid and is added until the uranium values have been converted to the chloride, and thereafter concentrated sulfuric acid is added in a quantity sufficient to open the ore.

5. The process of recovering uranium values from uranium- and calcium carbonate containing ores comprising disintegrating the ore, digesting the ore with concentrated hydrochloric acid in a quantity to convert from 0.4 to 0.6% of the calcuim carbonate to calcium chloride and the uranium to uranium chloride, adding concentrated sulfuric acid to the digested ore mixture, removing water from the slurry by heating it to about 75° C., adding acetone to the acidulated ore whereby an acetone system is obtained, adding water to the acetone system in a quantity of between 50 and 150 g./l. of the acetone slurry, separating a residue from an acetone solution, introducing anhydrous ammonia to said acetone solution whereby uranium values, vanadium values and iron values are precipitated, and separating the precipitate from the acetone.

6. The process of recovering uranium values from uranium- and calcium carbonate-containing ores comprising disintegrating the ore, digesting the ore with concentrated hydrochloric acid in a quantity to convert from 0.4 to 0.6% of the calcium carbonate to calcium chloride and the uranium to uranium chloride, adding concentrated sulfuric acid to the digested ore mixture, removing water from the slurry by heating it to about 75° C., adding acetone to the acidulated ore whereby an acetone system is obtained, adding water to the acetone system in a quantity of between 50 and 150 g./l. of the acetone slurry, separating a residue from an acetone solution, introducing ammonia to said acetone solution whereby uranium values, vanadium values and iron values are precipitated, separating the precipitate from the acetone, washing the precipitate with water whereby ammonium chloride is dissolved, dissolving the washed precipitate in sulfuric acid whereby a sulfuric acid solution of uranium, vanadium, and ferric sulfates is obtained, introducing ammonia into said sulfuric acid solution until a pH value of about 2 is obtained whereby a precipitate of ferric vanadate and ferric hydroxide is formed while the uranium values remain in solution, separating said precipitate from said uranium solution, adding concentrated ammonium hydroxide to said uranium solution until a pH value of about 7 is obtained whereby the uranium values are precipitated as ammonium diuranate, washing said ammonium diuranate with ammonium hydroxide, and calcining the washed ammonium diuranate whereby uranium oxide, $U_3O_8$, is obtained.

References Cited in the file of this patent

UNITED STATES PATENTS

| | | |
|---|---|---|
| 1,165,693 | Moore | Dec. 28, 1915 |
| 2,227,833 | Hixson et al. | Jan. 7, 1941 |

UNITED STATES PATENT OFFICE

CERTIFICATE OF CORRECTION

Patent No. 2,800,387                         July 23, 1957

Robert B. Kimball et al.

It is hereby certified that error appears in the printed specification of the above numbered patent requiring correction and that the said Letters Patent should read as corrected below.

Column 6, line 28, for "142 g. Cl/1" read -- 14.2 g. Cl/1 --; line 44, for "ferric canadate" read -- ferric vanadate --.

Signed and sealed this 18th day of November 1958.

(SEAL)

Attest:

KARL H. AXLINE
Attesting Officer

ROBERT C. WATSON
Commissioner of Patents